United States Patent [19]

Timms

[11] 4,407,120
[45] Oct. 4, 1983

[54] THRUST REVERSER GEARED LINKAGE

[75] Inventor: Richard H. Timms, San Diego, Calif.

[73] Assignee: Rohr Industries, Inc., Chula Vista, Calif.

[21] Appl. No.: 180,671

[22] Filed: Aug. 25, 1980

[51] Int. Cl.³ .......................... F02K 1/00; F02K 3/02; B64C 15/00
[52] U.S. Cl. .................................... 60/226.2; 60/230; 239/265.29; 239/265.31
[58] Field of Search .................... 60/226 A, 229, 230; 239/265.29, 265.31

[56]  References Cited

U.S. PATENT DOCUMENTS

| 3,500,646 | 3/1970 | Hom | 60/226 A |
| 3,511,055 | 5/1970 | Timms | 239/265.31 |
| 3,759,467 | 9/1973 | Roudil | 60/229 |

Primary Examiner—Douglas Hart
Attorney, Agent, or Firm—Patrick J. Schlesinger; Frank D. Gilliam

[57]  ABSTRACT

A thrust reverser for the gas stream of a turbofan jet aircraft engine. The engine having a surrounding cowl section which forms a duct therebetween for engine gases. The surrounding cowl is divided into two sections, a forward fixed in position section and an aft translatable section. The thrust reverser operating mechanism comprises a plurality of reverser or blocker doors rotatable in and out of the duct. The operation mechanism of each of the reverser blocker doors comprises a pinion gear rotatable about a central axis which engages a pair of opposing gear racks, one gear rack attached to the forward fixed in position cowl section and the other attached and translated with the aft translated cowl section and link members interconnecting the pinion gear, where they have an off center pivotal attachment, and the reverser or blocker doors where they have a like pivotal attachment. The translation of the aft cowl section causes the reverser or blocker doors to rotate in and out of the duct, simultaneously providing an opening between the cowl section and respectively uncovering or covering a flow reversing cascade ring.

5 Claims, 9 Drawing Figures

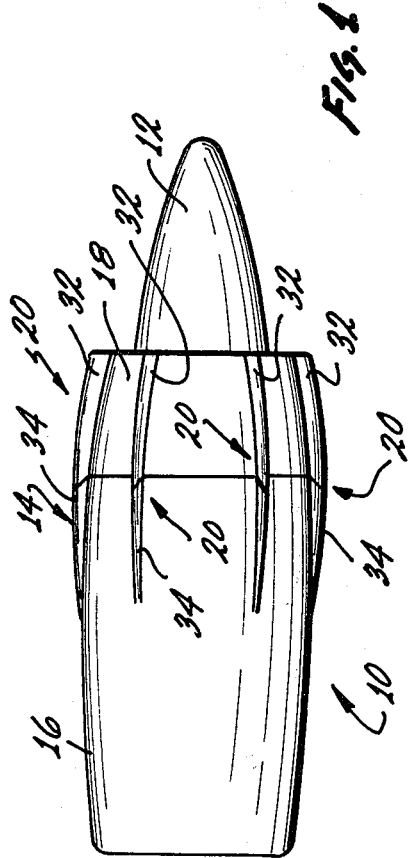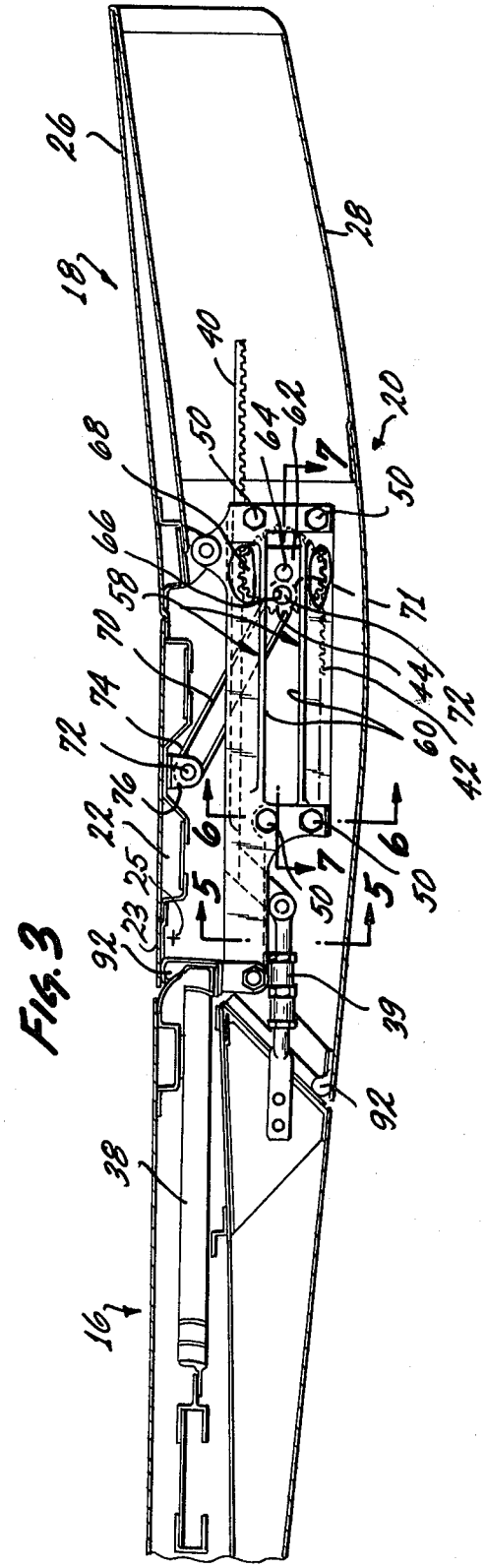

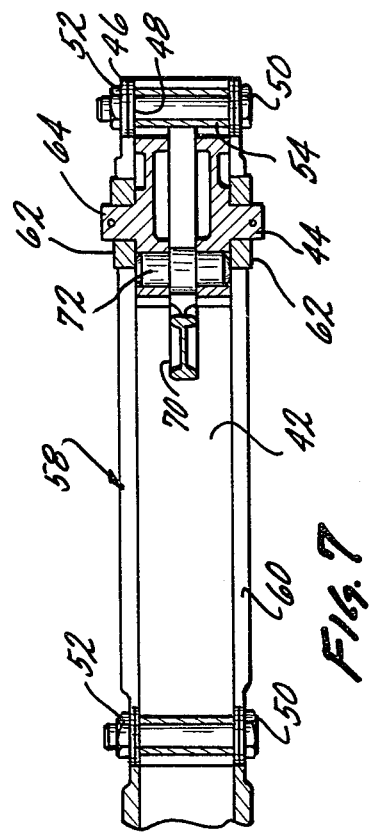
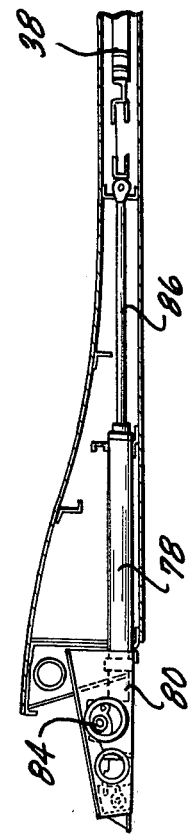
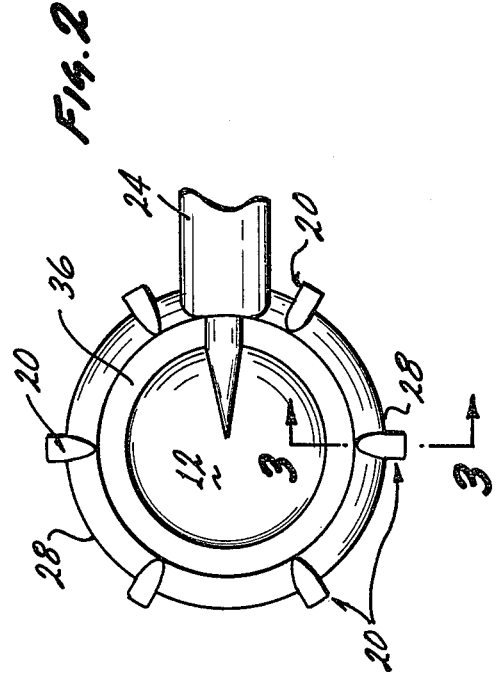
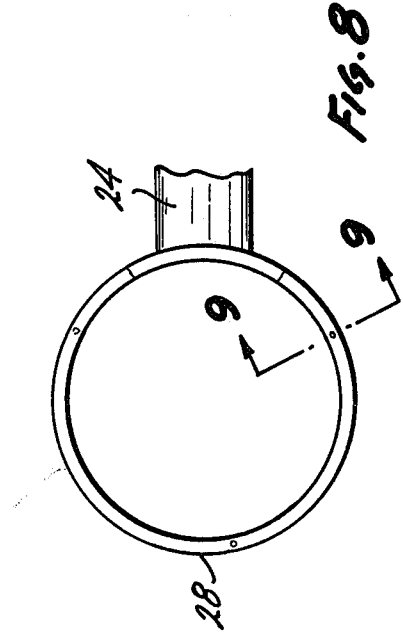

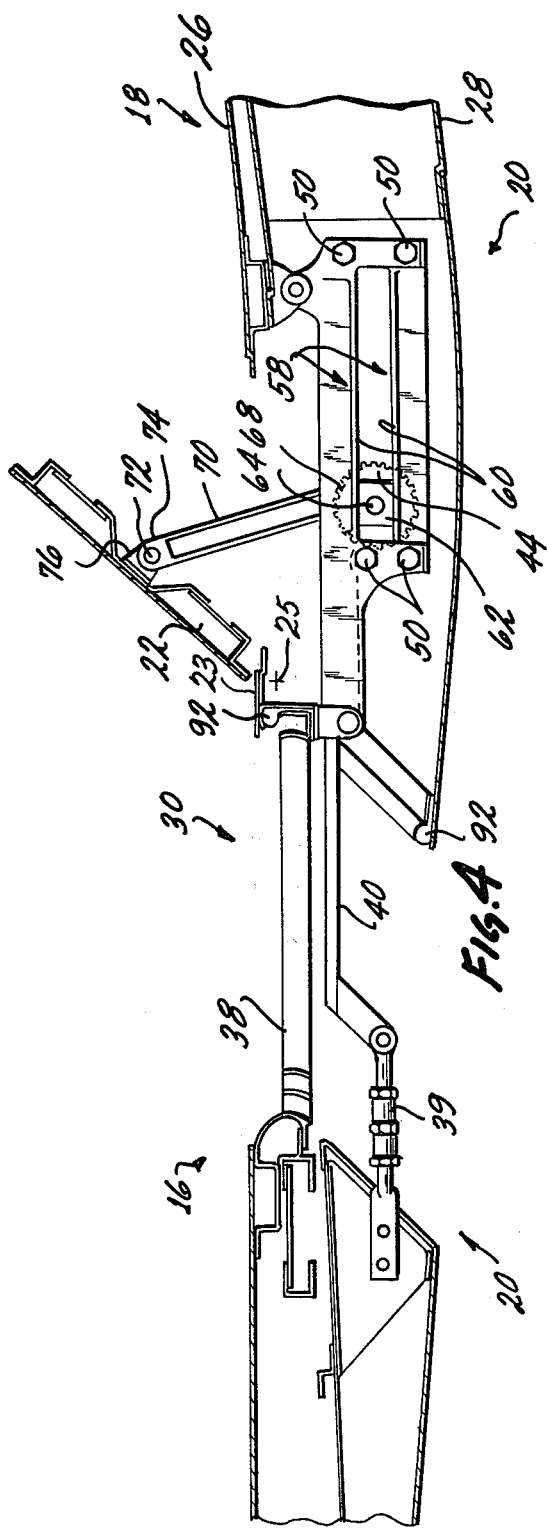

THRUST REVERSER GEARED LINKAGE

BACKGROUND OF THE INVENTION

The invention relates to thrust reversing of aircraft gases and more specifically to the reversing of fan gases of a turbofan engine.

Various difficult types of fan gas reversers presently exist, most of which are considered to be useful for their intended purpose. Some of the prior art reversers utilize cowl section translation with simultaneous deployment of reverser or blocker doors, as well as providing an opening in the cowl surrounding the turbofan engine with a translatable cascade ring being positioned therein to provide an exit and direct the gases forwardly through.

Actuation mechanisms generally consist of links and linear actuator means for both cowl section translation and reverser or blocker deployment. A novel two-part reverser or blocker door is taught by U.S. Pat. Nos. 3,964,257 and 4,073,440, wherein the abutting ends of the reverser or blocker doors form curved single rack gears with interlocking and meshing teeth so that both reverser or blocker door operate simultaneously between their stowed and deployed positions. A clam shell type thrust reversing mechanism having curved single rack gear abutting ends on each claim shell for simultaneous movement between their stowed and deployed positions are taught in U.S. Pat. No. 3,759,467.

As aforementioned, most of the existing thrust reversing mechanisms have various merits and in most instances have been used with some degree of success. The principle objections have included requirements for excessive operating mechanism to insure uniform reverser or blocker door deployment that results in excess weight, which is critical in aircraft, higher economic costs and complexity with the resulting high maintenance both in down time and cost, and very little of any consideration of design was directed toward maintaining excess area size balance during the deployment of the reverser or blocker doors to prevent the possible loading or stalling of the engine (through back pressure).

SUMMARY OF THE INVENTION

The present invention obtains the benefits aforementioned while, in addition, providing an apparatus that has a positive action between a reverser or blocker door stowed and deployed position; weight has been reduced by a reduction of active elements required, which further reduces the required aircraft maintenance and resulting down time; the operation of the mechanism between the reverser or blocker door stowed and deployed positions provides and maintains engine pressure balance during deployment; and when the blocker doors are in their stowed position, the duct is free of drag producing door operating mechanism.

Generally stated, in the presently preferred form, the apparatus includes an elongated streamlined cowl surrounding the engine and control plug nozzle and is radially spaced therefrom to form a duct therebetween. The aft portion of the streamlined cowl section is translatable from a forward stowed position, where it abuts in a sealed relationship with the fixedly positioned forward cowl section, and aft deployed position where it forms an opening between the cowl sections for the exit of the engine gases in a reversed direction. A plurality of blocker doors are carried by the aft cowl section during translation. When the aft cowl section is translated aft, the blocker doors are rotated into the duct by two link members attached thereto at one end, with their other ends attached to a pinion gear at an off-center location. The teeth of the pinion gear engage two opposing gear racks, one gear rack is attached to and carried by the aft cowl section and the other gear rack is attached to the forward, fixedly-positioned cowl section. The translation of the aft cowl section causes the pinion gear to rotate, causing the links to rotate on the pinion gear and translate toward the central plug which rotates the reverser doors in or out of the duct depending on the direction of aft cowl translation.

Various other advantages and features of novelty will become apparent to those skilled in this art as the description proceeds in conjunction with the accompanying drawings in which:

BRIEF DESCRIPTION OF THE DRAWINGS

FIG. 1 is a side elevated showing of a turbofan engine with enclosing cowl and central plug.

FIG. 2 is a rear view of the turbofan engine of FIG. 1 including aircraft pylon attachment means.

FIG. 3 is a section taken along line 3—3 of FIG. 2.

FIG. 4 is a showing of FIG. 3 with the aft cowl section translated to an aft blocker door deployed position.

FIG. 5 is a section taken along line 5—5 of FIG. 3.

FIG. 6 is a section taken along line 6—6 of FIG. 3.

FIG. 7 is a section taken along line 7—7 of FIG. 3.

FIG. 8 is a section of the turbofan engine of FIG. 1 looking forward at the aft cowl section actuating means.

FIG. 9 is a section taken along line 9—9 of FIG. 8.

DESCRIPTION OF THE PREFERRED EMBODIMENT

The same reference numerals are used through the specification to depict the same or identical part or element.

FIG. 1 depicts an elevated side profile of a typical turbofan jet engine 10 with which the instant invention is practiced. The core engine, not shown, includes a central plug 12 and a surrounding streamlined cowl 14. This streamlined cowl 14 is divided longitudinally into two sections, namely, a forward fixed section 16 and an aft translatable section 18. These cowl sections 16, 18 include a plurality of spaced apart fairings 20. A portion of each fairing 20 is carried by each cowl section 16, 18 and when the cowl sections abut in a stowed position, the fairing portions likewise abut. The fairing portions house portions of the aft cowl translation and reverser or blocker door 22 (shown in various figures) and its rotating-deploying mechanism, hereinafter discussed in specific detail.

FIG. 2 shows the rear of the turbofan engine assembly looking forward. In addition to FIG. 1, the engine aircraft pylon attachment 24 for engine mounting is shown.

FIG. 3 is a partial section of the cowl 14 taken along line 3—3 of FIG. 2, exposing the operating mechanism of the apparatus of the instant invention. As discussed above, the operating mechanism is substantially concealed within the fairing 20 between the inner and outer cowling air flow surfaces 26, 28, respectively, and the fairing 20 is divided into two longitudinal sections: an aft fairing section 32 and a forward fairing section 34. One section is positioned on each of the cowl sections.

The forward cowl section 16 is attached to the aircraft structure (not shown) and is fixed in position and the aft cowl section 18 is translatable with respect to the forward cowl section 16 between a forward stowed and a rearward fully translated position. When the reverser or blocker doors 22 are in a stowed position, as shown in the last mentioned figure, the inner surface of the forward cowl section 16, the inner surface of the reverser or blocker doors 22, and the aft cowl section 18 form the outer fan gas boundaries, i.e. the inner walls of duct 36 (see FIG. 2). The outer cowl surface 28, see FIGS. 2, 3, 4, and 8, along with the outer surface of fairing 20 define the boundaries of the air stream passing along the outer surfaces of the engine 10 during flight. A translatable cascade ring 38 attached to the aft cowl section 18 and nests between the inner and outer surfaces 26, 28, respectively, of the aft cowl section 18 when the aft cowl section is in its forward-most stowed position, see FIGS. 1 and 3.

Each reverser or blocker door 22, typically five or more are utilized, include hinges (not shown) connected between the ring 23 and the adjacent leading edge of the blocker doors forming a forward hinge line 25 and a deploying mechanism. This deploying mechanism comprises a pair of gear racks 40, 42, respectively, each gear rack having gear teeth along one surface. Gear rack 40 is shown as attached in a fixed location to aircraft structure through support hardware 39 and gear rack 42 is shown attached to and carried by the translatable aft cowl section 18 through an attachment to the fixed cascade ring 38. It should be understood that the invention could be practiced with the same effectivity if the position of the gear racks 40, 42, with respect to the control engine plug 12 were reversed in their relative positions as shown in the various figures.

The translating gear rack 42 provides support means for a pinion gear 44. The support means, see FIGS. 3-6, is formed by an outer and inner support shells 46, 48 which are held in place by convenient fastener means, bolt and nut combinations 50, 52, respectively, as shown, with a spacer 54 positioned around each bolt 50 between the inner wall 56 of the inner support shell 46. The support assembly includes track 58 with bushing surfaces 60 for engaging two slide blocks 62 (one shown with an identical one on the opposite side of the support assembly) carried by the central axle 64 of the pinion gear 44, see FIGS. 3, 4 and 7. As can be readily understood, the slider blocks 62 and the pinion gear 44 are carried, and held in their relative positions by the pinion gear central axle 64 and bushing surfaces 60 of tracks 58. The pinion gear 44 has an aperture 66 located intermediate the central axle 64 and its gear teeth 68.

Door links 70 are positioned on each side of the pinion gear 44 and are carried at end 71 by a pivot pin 72 passing through the pinion gear aperture 66 and carried therby. The pivot pin 72 may be maintained in position by any known keeper means. The reverser or blocker door links 70 are rectilinear in form with their ends 74 opposite the pinion gear end 71 are pivotly attached through a second pivot 72 to a reverser door boss 76.

It should be noted that the door links 70 attachment to boss 76 is positioned nearer the central engine plug 12 than the door links' pinion gear connection 71.

Referring now to FIGS. 4, 7, and 9 in detail, the aft translatable cowl section 18 is shown translated to its maximum deployed (aft) position. This translation is accomplished by a plurality of linear actuator means 78. The linear actuator 78 are pivotly attached at their forward end 80 to aircraft structures. A motor means well known in the art (not shown) is selectively operated from a remote location, drives a flexible drive shaft, which is interconnected at 84, to each linear actuator means 78, three or more linear actuators are generally used depending on size and weight of the aft cowl section 18. The drive shaft 84 uniformly extends and retracts the linear actuator rod 86 of each linear actuator means 78, thus uniformly translating the aft cowl section 18. The distal ends of the linear actuator rods 86 are pivotly attached to the cascade ring 38. As can be readily seen, the slider blocks 62 are translated to the forward end of track 58 (the pinion gear 44 being positioned at the forward end of the translatable gear rack 42) and at the aft end of fixed gear rack 40. The translation of the aft cowl section 18 rearward provides an opening 30 between the cowl sections 16, 18 and fairing 20 for the exiting of the blocked gases through the reversing cascade ring 38 which direct the gases forwardly through the opening 30.

A two-part pressure seal 92 carried by the aft cowl section 18 provides a seal between the cowl section 16, 18 when they are in their stowed abutting position (see FIG. 3).

It should be understood that because gear rack 42 translates with the cowl section 18, the door link pivots 72 actually travel longitudinally approximately twice the distance of the longitudinal translation pinion gear 44. This feature causes the links on the rearward translation of the cowl section 18 to effectively extend, forcing the blocker doors inward and to correspondingly rotate about their hinge attachment along hinge line 25. The physical position of linds 70 insure that the links rotate inward, deploying the reverser or blocker doors 22 when the aft cowl section 18 translates rearward, and returns the reverser blocker doors 22 to their stowed positions when the aft cowl section 18 is returned to its position abutting the forward cowl section 16.

It will be apparent that the invention described above provides apparatus which performs the desired thrust gas reversing function very effectively in a positive manner and with the minimum number of components arranged so that they can be concealed withn the cowling and fairing structures. The construction being simple and rugged for low initial cost and low maintenance expense.

What is claimed as new and useful and desired to be secured by United States Letters Patent is:

1. An improved thrust reversing apparatus for reversing the fan or total gas stream of turbofan jet engine having a central plug nozzle, surrounded by a cowl which forms a duct therebetween, said cowl having a fixedly positioned forward section and an aft translatable cowl section, an opening is formed between said cowl sections when said aft cowl section is translated aft comprising:

a plurality of rotatable blocker doors associated with said aft translatable cowl section for substantially reversing the normally rearward directed flow of said gas stream when rotated to a deployed position and defining a portion of the duct when in a stowed position; and mechanism for rotating each of a plurality of blocker doors, said mechanism comprising a pinion gear rotatable about an axle shaft, a pair of opposing gear racks for engagement with said pinion gear, one of said racks fixedly attached to the forward cowl section, and at least one link member pivotly attached to said pinion gear at an off center location at a first end and to one of said blocker doors at a second end, whereby the translation of the translatable cowl section rotates the pinion gear along the racks about said axle shaft causing the attached link member to translate and rotate causing the blocker doors to rotate into and block off the duct.

2. The invention as defined in claim 1 wherein two link members are utilized, one positioned on each side of the pinion gear.

3. The invention as defined in claim 1 wherein said at least one link member has its blocker door pivotal attachment positioned nearer said central plug than the link pinion gear pivoted attachment.

4. The invention as defined in claim 1 additionally comprising a translating rack support means including a track means and a slider bushing member carried by said pinion gear axle shaft, said slider bushing member is carried by and slidablly engages said track member, whereby said pinion gear rotates around said axle shaft and translates along said track when the translatable cowl section translates.

5. The invention as defined in claim 1 wherein a translatable cascade member is translated to a position within said opening between said cowl section when said aft cowl section translates rearward, said cascade member including gas turning vanes for directing said gas forward where said blocker doors are deployed.

* * * * *